United States Patent

(12) United States Patent
Holtstrand

(10) Patent No.: US 6,861,026 B2
(45) Date of Patent: Mar. 1, 2005

(54) METHOD OF MAKING A PIPE HAVING A SOCKET

(75) Inventor: Per Holtstrand, Sparsör (SE)

(73) Assignee: Uponor Innovation AB, Fristad (SE)

( * ) Notice: Subject to any disclaimer, the term of this patent is extended or adjusted under 35 U.S.C. 154(b) by 332 days.

(21) Appl. No.: 10/200,603

(22) Filed: Jul. 22, 2002

(65) Prior Publication Data

US 2003/0030182 A1 Feb. 13, 2003

Related U.S. Application Data

(63) Continuation of application No. PCT/IB01/00083, filed on Jan. 25, 2001.

(30) Foreign Application Priority Data

Jan. 28, 2000 (FI) .............................................. 20000180

(51) Int. Cl.⁷ .......................... B29C 33/76; B29C 43/10; B29C 57/06; B29C 57/08; B29D 23/00
(52) U.S. Cl. ........................ 264/573; 264/294; 264/296; 264/314; 264/320; 264/322
(58) Field of Search .................................. 264/294, 296, 264/314, 320, 322, 573

(56) References Cited

U.S. PATENT DOCUMENTS

2002/0073758 A1 * 6/2002 Rempe et al. ............. 72/370.1

FOREIGN PATENT DOCUMENTS

| EP | 0133687 A2 * | 3/1985 |
|----|--------------|--------|
| EP | 0 404 557 A2 | 12/1990 |
| FR | 2 758 381 A1 | 7/1998 |
| GB | 1 432 539 A | 4/1976 |
| WO | 98/13190 A1 | 4/1998 |

* cited by examiner

Primary Examiner—Leo B. Tentoni
(74) Attorney, Agent, or Firm—Fish & Richardson P.C.

(57) ABSTRACT

A method and an apparatus for making a pipe, and a pipe, wherein the pipe is made from a plastic feedstock pipe by expanding it against a mould. In the first step, that portion of the plastic feedstock pipe (4) which is to have a greater diameter than the rest of the pipe is partly expanded. Only after this is the entire plastic feedstock pipe (4) expanded against the mould (1).

6 Claims, 4 Drawing Sheets

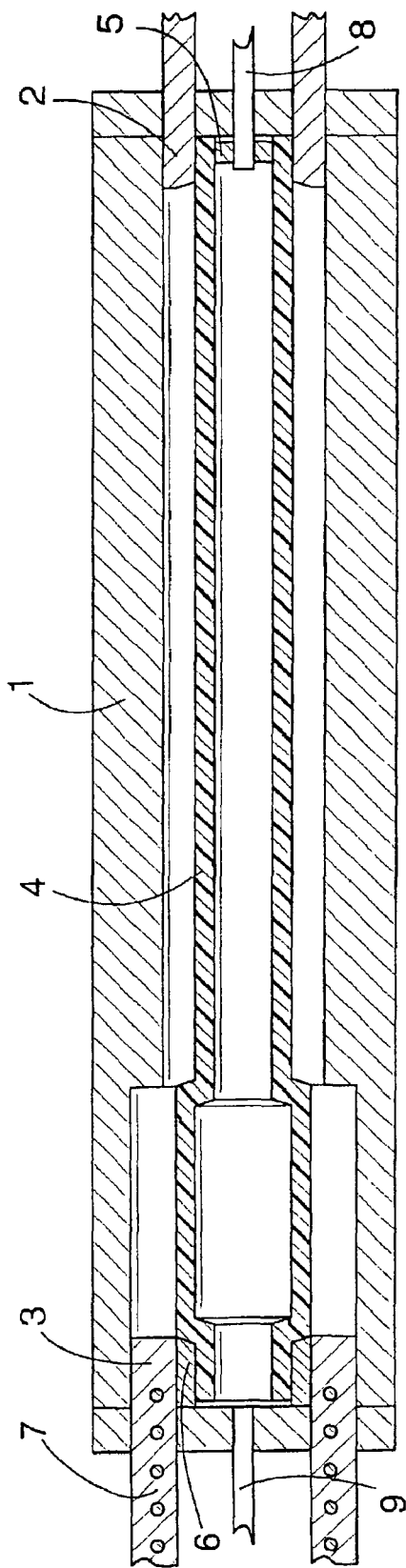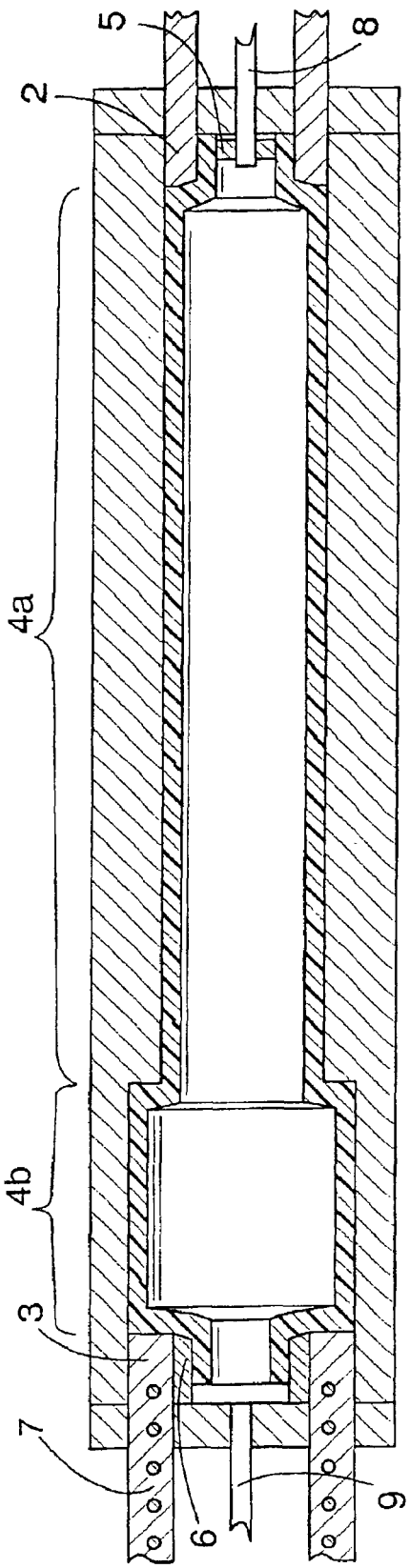

Figure 1:
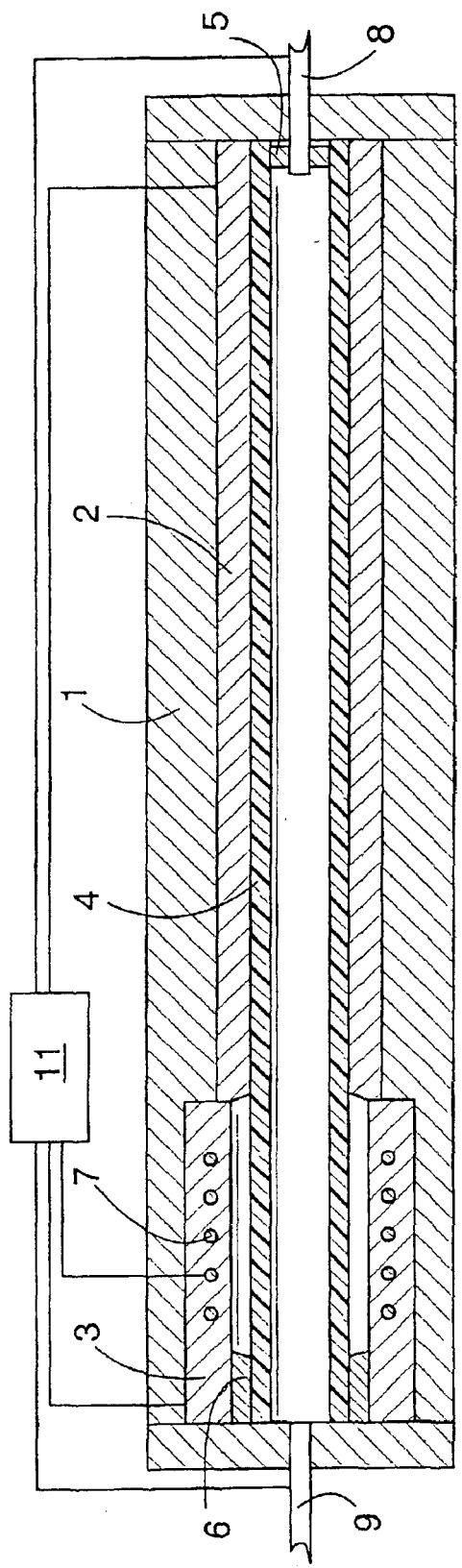

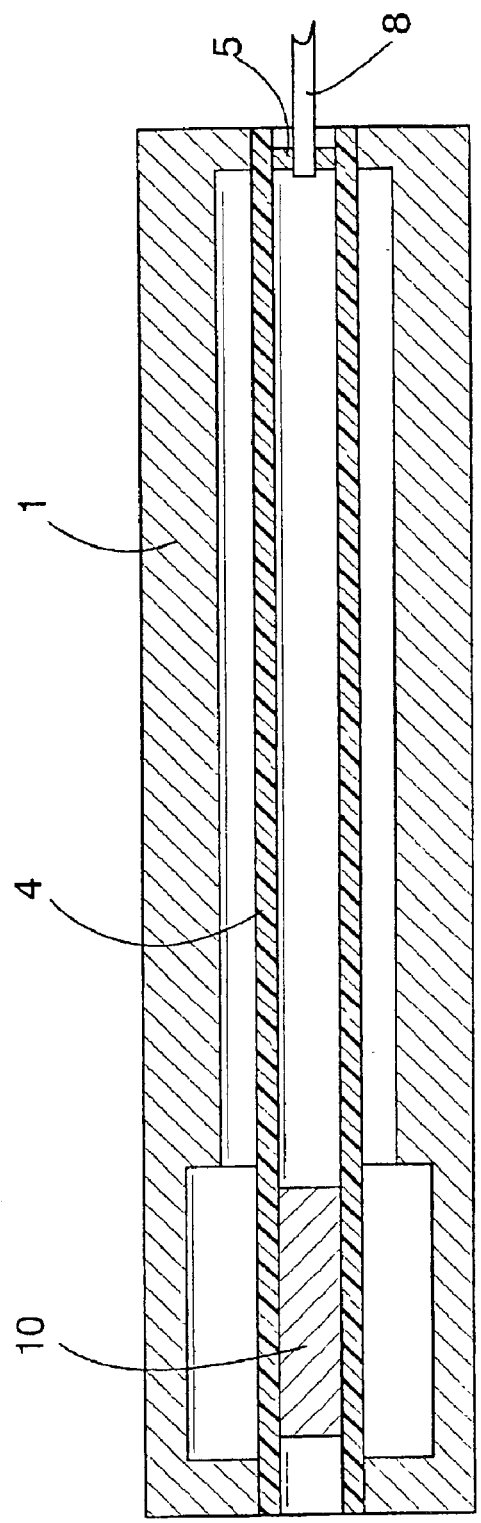
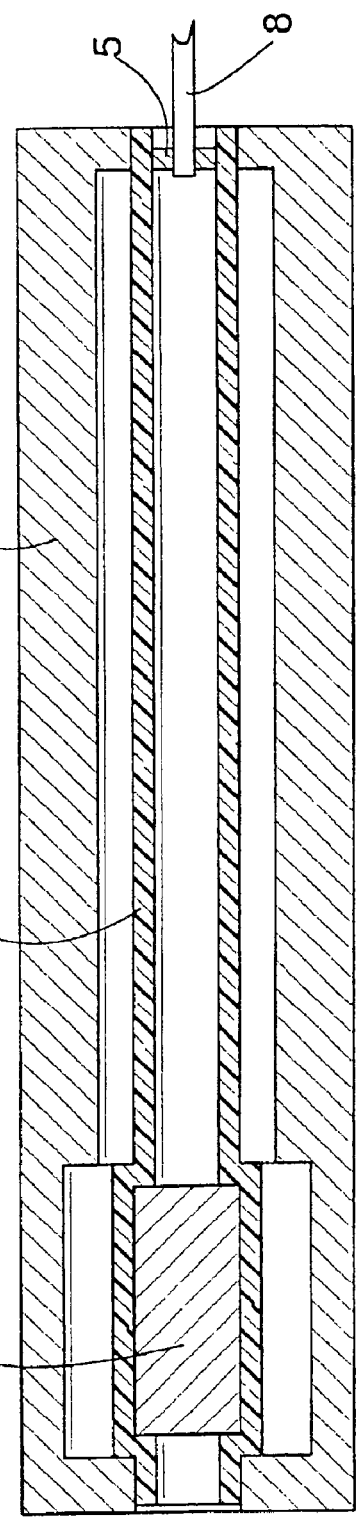

METHOD OF MAKING A PIPE HAVING A SOCKET

This application is a continuation, and claims under 35 USC 120, the benefit of priority of International Application No. PCT/IB01/00083, filed Jan. 25, 2001 which claims priority from Finland Application No. 20000180, filed Jan. 28, 2000. The disclosure of the prior applications is considered part of, and is incorporated by reference in, the disclosure of this application.

The invention relates to a method of making a pipe having a socket.

The invention further relates to an apparatus for making a pipe having a socket, the apparatus comprising a mould and means for expanding a plastic feedstock pipe against the mould.

The invention still further relates to a pipe having a socket and made from a plastic feedstock pipe by expanding it against a mould so that a portion of the pipe has a larger diameter than the rest of the pipe.

GB 1,432,539, for example, discloses a solution for making pipes with molecular orientation from e.g. polyvinyl chloride by blowing in a mould. In said solution, a blank is inserted into the mould, heated and expanded against the mould by blowing from the inside. By simultaneously providing the pipe with a pipe socket, accurate external dimensions are obtained for the socket, but the internal, i.e. significant, dimensions remain inaccurate. At a socket to be formed at the end of a pipe, for example, the blank expands last. This causes an axial compression at the socket, which, together with a strong circumferential orientation, weakens the mechanical properties of the socket. Since the blank expands more at the socket than in other portions, the socket portion also becomes thinner than the other portions. For this reason the portion to constitute the socket is often arranged thicker than the rest of the blank, which further contributes to the socket being finished later than the rest of the plastic pipe.

WO 98/13190 discloses a solution in which compressive tension at the socket portion is reduced by axial drawing. According to the publication, at a first phase a tube blank is partly expanded along its entire length and at a second phase a casing is withdrawn to subject the tube blank to a longitudinal drawing during final expansion. Said solution is extremely complex and cumbersome to implement.

It is the object of the present invention to provide a method, apparatus and pipe, which alleviate at least some of the above drawbacks.

The method of the invention is characterized by expanding a plastic feedstock pipe partly in the portion intended to have a greater diameter than the rest of the pipe and not expanding the plastic feedstock pipe against a mould until after said pre-expansion.

The apparatus of the invention is characterized by comprising means arranged to expand the plastic feedstock pipe partly in the portion intended to have a greater diameter than the rest of the pipe, so that a pre-expansion is formed at said portion, the means for expanding the plastic feedstock pipe against the mould being arranged to expand the plastic feedstock pipe against the mould after the pre-expansion.

The pipe of the invention is characterized by the plastic feedstock pipe being expanded partly in the portion having a greater diameter than the rest of the pipe, and by the plastic feedstock pipe being expanded against the mould after said pre-expansion.

It is an essential idea of the invention that a plastic pipe is made from plastic feedstock pipes by expanding it against a mould such that pre-expansion is carried out, whereby the plastic feedstock pipe is expanded partly in the portion intended to have a greater diameter than the rest of the pipe, and thereupon the entire plastic feedstock pipe is expanded against the mould in a second step. It is the idea of a preferred embodiment that in the first step, i.e. when the socket portion is being pre-expanded, the temperature of the portion to be expanded is raised higher than the orientation temperature of the material. It is the idea of a second preferred embodiment that the socket is pre-expanded by a mechanical expanding device arranged within the plastic feedstock pipe.

It is an advantage of the invention that pre-expansion of the socket portion results in the socket portion expanding during final expansion simultaneously with or before the rest of the tube, whereby undesired axial compression in the socket portion can be reduced or eliminated. If pre-expansion is carried out at such a high temperature that it does not cause molecular orientation, the blow up ratio, i.e. circumferential orientation degree, of the socket portion can be reduced as compared with prior art solutions. In prior art solutions, the blow up ratio in the socket portion is higher as compared with the rest of the pipe, and the method of the invention allows a pipe to be provided whose blow up ratio is substantially equal along the entire length of the pipe. Pre-expanding the socket portion of a plastic feedstock pipe allows the blowing of the socket portion and its dimensions to be controlled better than previously, i.e. the desired internal dimensions for the socket portion can be provided more accurately. By implementing the pre-expansion of the socket portion by a mechanical device allows final expansion to be arranged substantially without an intermediate step after pre-expansion, whereby the pipe can be made by a simple method and the time taken by making the pipe remains relatively short. Furthermore, a mechanical pre-expanding device allows the internal dimensions of the socket portion to be expanded accurately, and in addition the rest of the pipe and the socket portion can be expanded substantially simultaneously.

Figure 7:
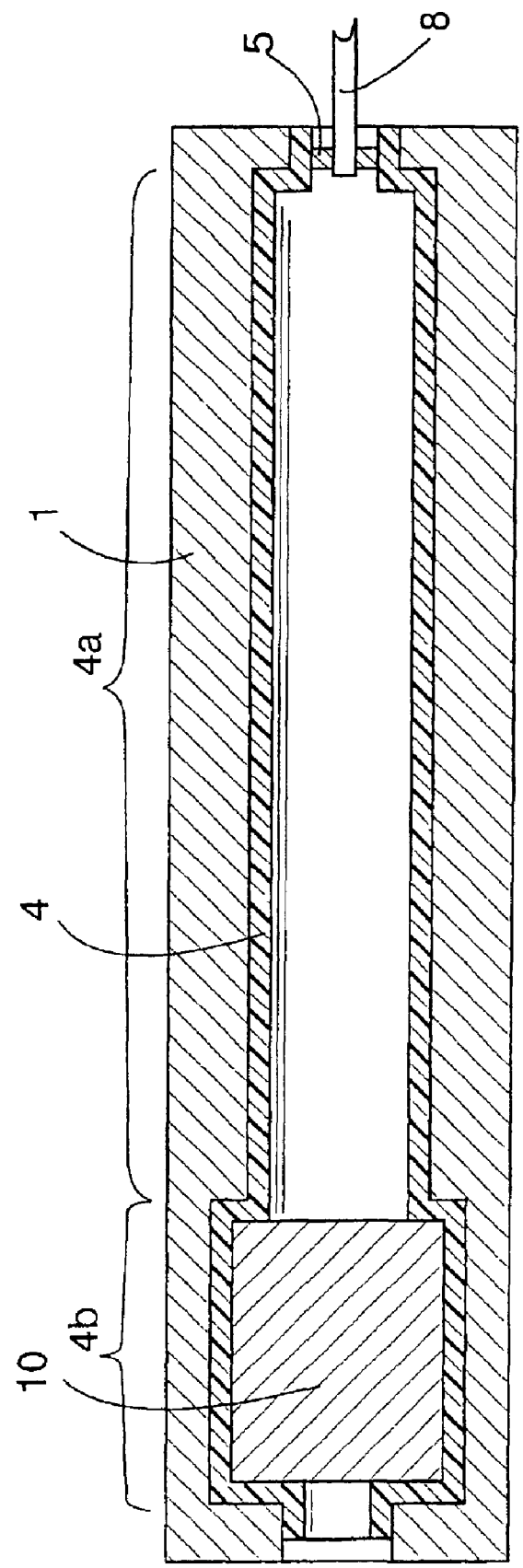

The invention will be described in greater detail in the attached drawings, in which FIGS. 1, 2, 3, and 4 are schematic side views of the different steps of a pipe making method of the invention showing the apparatus in cross-section, and FIGS. 5, 6, and 7 are schematic side views of the different steps of a second pipe making method of the invention showing the apparatus in cross-section.

FIG. 1 is a sectional side view of an apparatus of the invention. Remotest in the apparatus is a mould 1, within which is arranged a casing 2 and a socket support 3. Within these is arranged a plastic feedstock pipe 4, whose ends are sealed by means of chucks 5 and 6.

Figure 2:
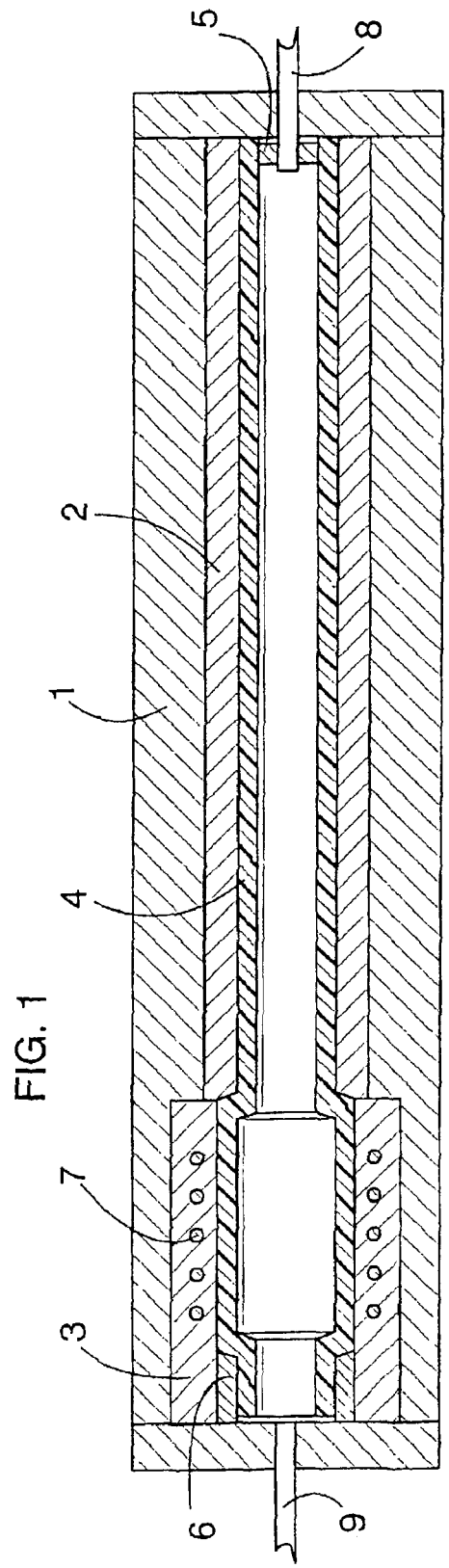

Once the plastic feedstock pipe 4 is arranged within the apparatus, at least that portion whose diameter in the final product is to be greater than the rest of the pipe is heated e.g. by electric resistors 7 disposed in the socket support 3 or by some other suitable heating means. It is possible to heat the plastic feedstock pipe 4 e.g. by a suitable medium, arranged to circulate either outside or inside the plastic feedstock pipe 4. Medium, e.g. air, is then fed via a first inlet duct 8 or a second inlet duct 9 to the inside of the plastic feedstock pipe 4 to raise the pressure within the plastic feedstock pipe 4 such that the plastic feedstock pipe 4 is pressed against the socket support 3 as is shown in FIG. 2. When the pressure within the plastic feedstock pipe 4 is being raised, medium can be fed either along the first inlet duct 8 or the second inlet duct 9 or along both of them. If medium is fed only along one of the inlet ducts, then the second inlet duct is closed at that time. To keep the pressure at a suitable level or to adjust the rise in pressure, medium may be fed e.g. along the first inlet duct 8 and let it flow out from within the plastic feedstock pipe 4 along the second inlet duct 9. By arranging the flow difference suitably, the pressure level can be easily adjusted. For the sake of clarity, the attached figures do not show valves for adjusting the flows. Before the plastic feedstock pipe 4 is expanded against the socket support 3, its temperature is preferably raised so high that the expansion does not cause orientation in the material of the plastic feedstock pipe 4. This way the blow up ratio of the socket portion in the final product will be equal to that of the rest of the pipe. In the use of e.g. polyvinyl chloride PVC, the temperature of the material is raised to at least 140° C. The temperature typically used is about 170 to 180° C. The temperature required also depends on how fast the plastic feedstock pipe is expanded against the socket support 3.

After the pre-expansion shown in FIG. 2, the socket support 3 and the casing 2 are withdrawn as is shown in FIG. 3. The pressure within the plastic feedstock pipe 4 is then raised such that the plastic feedstock pipe 4 is pressed against the mould 1 in the manner shown in FIG. 4. For the sake of clarity, the attached figures do now show e.g. channels in communication with the mould 1 and the socket support 3, via which air is discharged from between the plastic feedstock pipe 4 and the mould 1, ensuring that the pipe to be made settles substantially tightly first against the socket support 3 and finally against the mould 1. This way a plastic pipe having a body 4a and a socket 4b is formed from the plastic feedstock pipe 4, the diameter of the socket 4b being greater than that of the body 4a. The actual expansion can be carried out at a temperature causing orientation in the material, i.e. when e.g. polyvinyl chloride PVC is used, the temperature of the material is about 90° C. Because of pre-expansion, the actual expansion takes place in such a way that the socket 4b portion expands first or simultaneously with the expansion of the body 4a. This way the ratio between the thickness of the wall of the plastic feedstock pipe 4 and the diameter of the plastic feedstock pipe 4 at the socket portion 4b provided by pre-expansion is smaller than or equal to the corresponding ratio at the body 4a to be formed.

FIG. 1 further shows a control device 11 that controls for example means for moving the casing 2 and the socket support 3, heating elements, and valves for controlling the flows in the inlet ducts 8 and 9. The control device 11 may be a computer or a microprocessor or another device suitable for the purpose and able to transmit the necessary control commands. For the sake of clarity, FIGS. 2 to 7 do not show the control device 11.

During pre-expansion, the end of the plastic feedstock pipe 4 on the side of the socket 4b to be formed may be arranged movable such that during pre-expansion of the socket 4b portion, the wall of the plastic feedstock pipe 4 at said portion does not become substantially thinner, or it in fact thickens. The plastic feedstock pipe 4 is typically expanded to such a degree that the diameter of the finished pipe is 1.5 to 2.5 times that of the diameter of the plastic feedstock pipe 4. The body portion is preferably expanded twofold. The socket portion 4b then typically expands 2.3-fold. Pre-expansion can be used to make both the body portion 4a and the socket portion 4b expand twofold in the final expansion. A sufficient increase caused by pre-expansion in the diameter is an addition of about 10 percent. Pre-expansion may be used to expand the socket portion 4b outwards by e.g. the thickness of the wall of the plastic feedstock pipe 4.

FIG. 5 shows an apparatus with a plastic feedstock pipe 4 arranged within a mould 1 and an expansion mandrel 10 arranged within the plastic feedstock pipe 4. An expansion mandrel 10 is a device for mechanically expanding the plastic feedstock pipe 4. The expansion mandrel 10 may be e.g. of rubber, whereby it expands when air is pumped inside thereof, whereby it simultaneously expands the plastic feedstock pipe 4. In the manner shown in FIG. 6, the expansion mandrel 10 is used to expand that portion of the plastic feedstock pipe 4, in which the socket 4b is formed. Before said pre-expansion of the socket portion 4b, the temperature of the plastic feedstock pipe 4 may be raised e.g. to such a temperature as to cause orientation in the plastic material. As mentioned above, said temperature is e.g. about 90° C. for polyvinyl chloride PVC.

After pre-expansion, pressure medium is supplied along the inlet duct 9 to the inside of the plastic feedstock pipe 4, whereby the plastic feedstock pipe 4 starts to be pressed against the mould 1 even at the body portion 4a. The expansion mandrel 10 is simultaneously expanded, thereby causing substantially the entire plastic feedstock pipe 4 to be pressed against the mould 1 in the manner shown in FIG. 7. The expansion mandrel 10 may keep on expanding substantially the whole time, and provided that the expansion of the body portion 4a is initiated at the right moment, no intermediate steps are required between pre-expansion of the socket portion and the actual expansion. The expansion mandrel 10 serves to determine the interior dimensions of the socket portion 4b extremely accurately.

The drawings and the related description are only intended to illustrate the idea of the invention. The details of the invention may vary within the scope of the claims. Accordingly, pre-expansion of the socket portion may be carried out outside the mould, whereby a plastic feedstock pipe 4 pre-expanded at the socket portion 4b is introduced into the mould 1 and final expansion is then carried out.

What is claimed is:

1. A method of making a pipe having a socket, comprising performing a pre-expansion by expanding a plastic feedstock pipe partly in a portion intended to have a greater diameter than the rest of the pipe and not expanding the plastic feedstock pipe against a mould until after said pre-expansion.

2. A method as claimed in claim 1, comprising arranging the temperature of the material during pre-expansion to be higher than its orientation temperature.

3. A method as claimed in claim 1, comprising expanding the diameter of the plastic feedstock pipe during pre-expansion by about 10%.

4. A method as claimed in claim 1, comprising expanding the plastic feedstock pipe during pre-expansion by a mechanical expanding device.

5. A method as claimed in claim 4, comprising expanding that portion of the plastic feedstock pipe which is to have a greater diameter than the rest of the pipe against the mould by a mechanical expanding device and expanding the rest of the plastic feedstock pipe against the mould by feeding medium within the plastic feedstock pipe to raise the pressure within the plastic feedstock pipe.

6. A method as claimed in claim 5, wherein pre-expansion and final expansion take place in successive steps substantially without intermediate steps.

* * * * *